INVENTOR.
Thomas Gordon Hart
By Davis, Hoxie, Faithfull & Hapgood
Attorneys

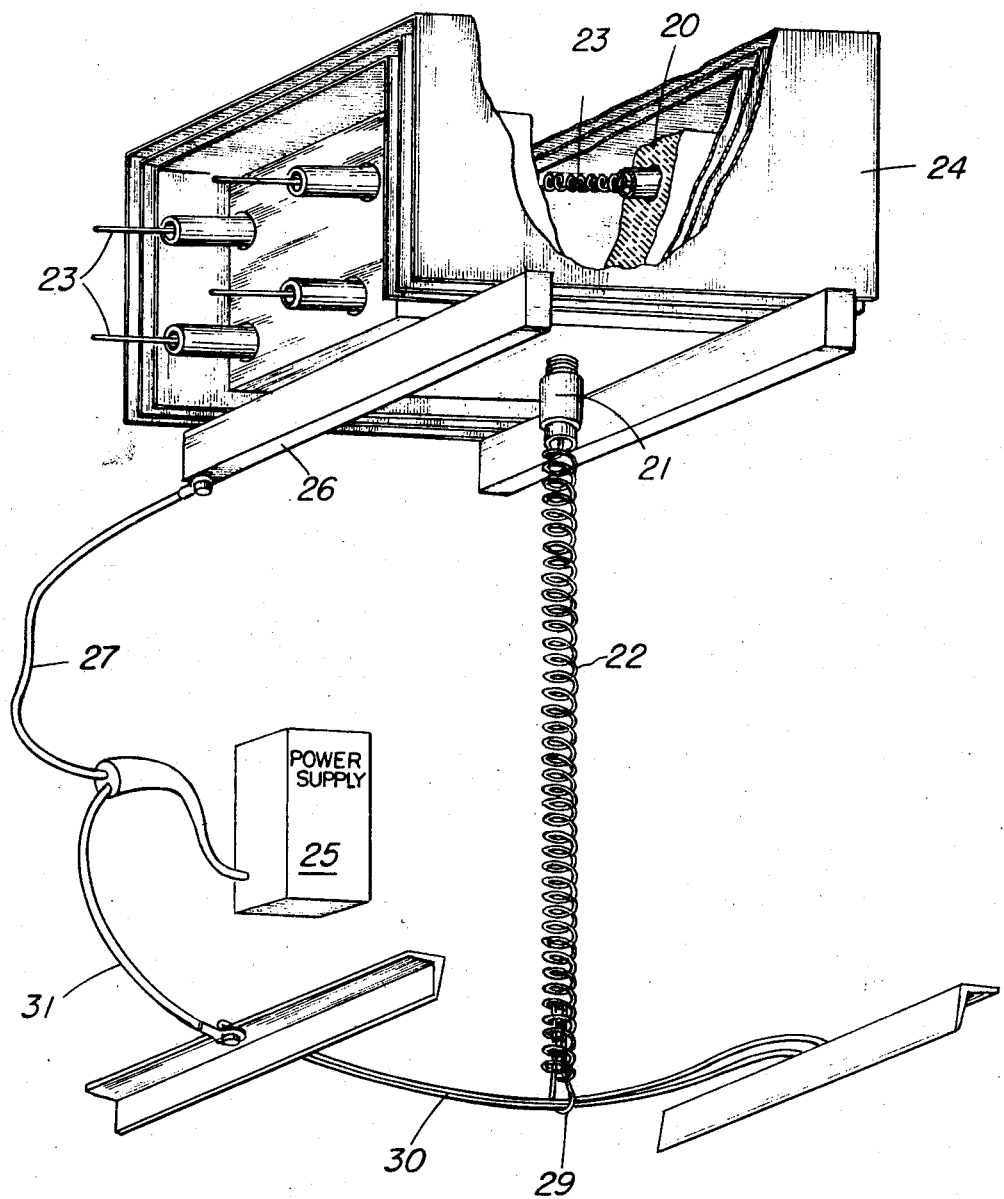

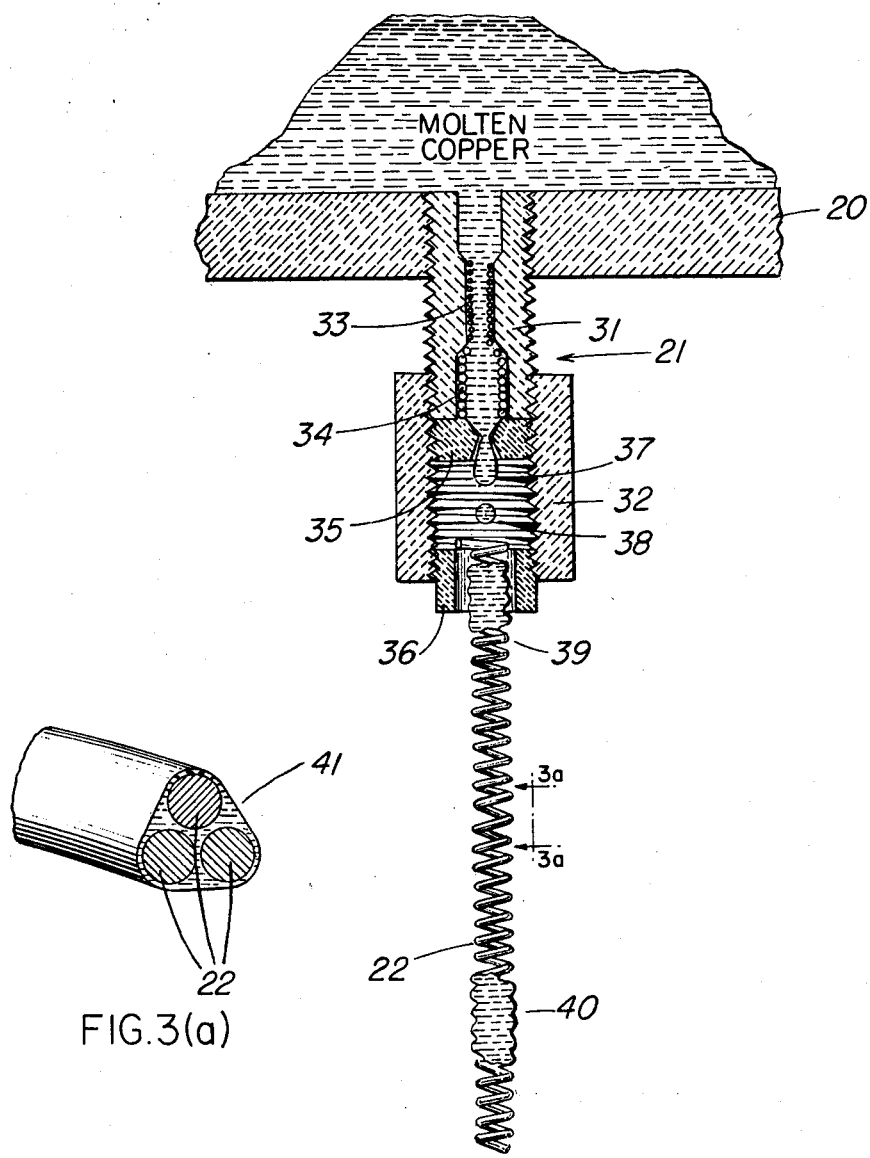

INVENTOR.
*Thomas Gordon Hart*
By *Davis, Hoxie, Faithfull & Hapgood*
Attorneys

United States Patent Office 3,506,803
Patented Apr. 14, 1970

3,506,803
METHOD AND APPARATUS FOR CONTINUOUS VAPORIZATION OF LIQUIDS
Thomas Gordon Hart, Cranbury, N.J., assignor to Phelps Dodge Corporation, New York, N.Y., a corporation of Delaware
Filed Apr. 8, 1968, Ser. No. 726,636
Int. Cl. F22b 1/00
U.S. Cl. 219—273        21 Claims

ABSTRACT OF THE DISCLOSURE

Material to be vaporized is deployed as a film forming a sheath about the turns of a vertical heating coil having the property of being wet by the liquid. The sheath is maintained by causing globules of the liquid to periodically travel down the coil. Liquid from the traveling globules distributes itself about the turns to replenish the sheath as liquid is vaporized.

---

This invention relates generally to the vaporization of materials by heating. More particularly, the invention relates to substantially continuous vaporization by electrical heating and has particular application to liquid metals such as molten copper and aluminum.

Essentially, the invention comprises means for specially discharging liquid from a container and for specially conveying the discharged liquid so as to be specially heated, the discharged liquid thereby being partly or wholly vaporized.

One main use of the invention is in vaporizing metals for the manufacture of foil or the coating of strip. Another main use is in vaporizing liquids for purification by distillation process. Another main use is in producing vapor for vapor heating purposes.

The chief advantages of the invention are in the simplicity, controllability and efficiency with which large quantities of heat are continuously furnished to liquids so as to continuously produce copious vapor.

These above and other features, uses, advantages and objects of the invention will be understood from the following sections of the disclosure of which:

Section I is an account of well known factors generally affecting vaporization;

Section II is an account of well known factors particularly affecting high rate vaporization for foil manufacturing and strip coating purposes; and Section III is a description of preferred embodiments of the invention.

(I) Well known factors affecting vaporization

All materials have more energy in vapor form than in liquid form. The difference between the liquid and vapor energies is commonly termed "heat-of-vaporization." For example, a pound of copper vapor has about one kilowatt hour more energy than a pound of molten copper at the same temperature, whch is to say the heat-of-vaporization of copper is about one kilowatt hour per pound. The heat-of-vaporization of a material is largely independent of temperature, atmospheric pressure or indeed anything else other than the inner physical nature of the material itself. Generally, the heat-of-vaporization of a material is many times greater than the specific heat, specific heat being a measure of the energy required to raise the temperature of the material. For example, the ratio of heat-of-vaporization (energy to vaporize one pound) to specific-heat (energy to raise one pound one degree centigrade) is about 500 to 1 for water and about 10,000 to 1 for copper.

When a liquid is supplied with energy, for example by heating, this energy is used up in three ways. Firstly, energy goes into the liquid as specific-heat and raises the temperature; secondly, energy goes into the liquid only to come out again as heat loss to the surroundings; and thirdly, energy goes into the liquid as heat-of-vaporization and vaporizes liquid. Now as the temperature of a liquid increases so does the rate of heat loss and so does the rate of vaporization. Accordingly, in response to being steadily supplied with energy, a liquid increases in temperature up to the point that the rate of heat loss and the rate of vaporization have increased sufficiently to account entirely for the energy being supplied. At this equilibrium point there is then a steady heat loss to the surroundings and a steady issuance of vapor, the temperature remaining constant. This temperature, at which heat loss and vaporization entirely account for energy being supplied, is termed, for the purposes of this discussion, the "vaporization-temperature."

It follows from the above that the factors mainly determining vaporization-temperature are (a) the energy input, (b) the heat-of-vaporization, (c) the heat loss, (d) the relationship between rate of heat loss and temperature, (e) the relationship between rate of vaporization and temperature. The first four of these five factors will be already more or less understood, but the fifth factor—the relationship between rate of vaporization and temperature—warrants further explanation as follows:

As already stated, the amount of energy needed to vaporize a pound of liquid depends little upon the atmospheric condition surrounding the liquid. On the other hand, the temperature which a liquid must attain in order to vaporize at a particular rate depends almost wholly on atmospheric condition. The reason for this is that rate of vaporization is determined not only by how much vapor leaves the liquid in a given time but also by how much vapor returns to the liquid in the same time, and how much returns depends upon the atmospheric condition. In this respect two different attributes of the atmosphere are important. On one hand, the pressure of the atmosphere is significant, the greater the pressure the more vapor molecules being returned by collision with atmosphere molecules and hence the lower the vaporization rate at a given temperature. On the other hand, the composition of the atmosphere is significant, particularly insofar as containing vapor identical with that the liquid is issuing. The more of this identical vapor the atmosphere contains, irrespective of course of whether this vapor came from the liquid itself or anywhere else, the more will find its way into liquid so as to reduce the netrate of vaporization at a given temperature.

From the above it follows that in the case of vaporization into what is commonly termed a "vacuum atmosphere" the dominant factor in determining rate of vaporization at a particular temperature is the atmosphere afforded by the vapor itself as it issues from the liquid. This is to say, even through the vaporization is accomplished in the virtually complete absence of any atmosphere other than the issuing vapor itself, high vaporization rates are generally obtained only at high equilibrium temperatures. This is to say also, as a practical matter, that when high-rate vaporization is undertaken in a vacuum tank, the pressure commonly referred to as "tank pressure"—usually a small fraction of a millimeter of mercury—is of little significance in determining the vaporization temperature. For example, in the vacuum vaporization of aluminum which melts at about 650° C., commercially useful vaporization rates may well require temperatures in excess of 1500° C. despite a tank pressure of less than one ten thousandths of a millimeter of mercury.

It will by now be understood that high powers at high temperatures are generally required for rapid vaporization of liquids and that very high powers at very high temperatures are required for liquid metals such as molten copper and aluminum. Hence, it will be understood that a primary problem in furnishing vaporizing means for commercial purposes is in furnishing high power at high temperature. It is, of course, well known that there are conventional means for furnishing high power at high temperature—for example, induction heating and electron beam heating. However, generally in vaporizing situations there are other problems in addition to the high power-high temperature problem and these other problems either restrict the use of conventional means or, in some situations, preclude the use entirely—as will be understood from the following:

(II) Factors affecting vaporizer design

In the present context, a main object in vaporizing a material is so as then to condense the vapor upon a suitable surface; for example, upon a rotating drum to make foil or upon a moving strip to coat the strip. Large quantities of vapor are involved in such a manufacturing operation typically, a few hundred pounds an hour. Hence, in view of the large quantities of vapor involved, it will be appreciated that even a small fraction of the vapor condensing in the equipment elsewhere but on the proper condensing surfaces can quickly lead to difficulties with such things as electrical insulation and eventually with equipment clogging. Hence, it will be understood that for some commercial purposes, for example, foil manufacture, vaporizing means are required which furnish copious vapor consistent however with confining the vapor so as to deposit substantially entirely over a limited area.

Further, particularly in connection with foil manufacture, it will be appreciated that vapor needs to issue from the vaporizer so as to condense more or less uniformly over the depositing surface. This is to say, of course, that substantial uniformity of thickness is a mandatory requirement for a product such as foil. Hence, it will be understood that for some commercial purposes, for example, foil manufacture, vaporizing means are required which furnish copious vapor consistent however with confining the vapor so as to deposit substantially entirely over a limited area and consistent however, additionally, with depositing the vapor substantially uniformly.

Further yet, particularly in connection with foil manufacture, it will be appreciated that if the vapor issuing from the vaporizer is accompanied by liquid particles, these liquid particles will deposit along with the vapor and cause lumps in the product. In this connection it is well known that certain metals, especially under high rates of vaporization, have a great tendency to issue these liquid particles along with the vapor, a phenomenon commonly termed "sputtering." Hence, it will be understood that for some commercial purposes, for example, foil manufacture, vaporizing means are required which furnish copious vapor consistent however with confining the vapor so as to deposit substantially entirely over a limited area, consistent however, additionally, with depositing the vapor substantially uniformly and consistent however, further additionally, with depositing the vapor unaccompanied by sputtered particles.

To provide such an ideal vaporizing means as enumerated above, for such commercial purpose as foil manufacture, is a main object of the present invention. So far as is known, such ideal vaporizing means have not hitherto been available. For example, it is well known by those skilled in the vaporizing art, that electron beam heating furnishes a vapor source which is deficient, firstly, in respect of vapor escape due to the necessity for beam access, deficient, secondly, in respect of uniformity due to the tendency for vapor ionization and hence beam distortion and deficient, thirdly, in respect of sputtering partly due to the high surface-temperature gradients intrinsic to electron beam heating. For further example, it is also well known that induction heating furnishes a vapor source which is deficient, firstly, in respect of uniformity due to the circumferential nature of the heating and deficient, secondly, in respect of sputtering due to the vagaries of the unconstricted liquid surfaces commonly found in induction-heated vapor sources.

It will by now be understood that conventional vapor sources, including electron beam and induction-heated sources, are deficient in respect of one or more of: vaporizing rate, vapor confinement, vapor uniformity, and freedom from sputtering. It will also by now be understood that any one of these deficiencies is sufficient to preclude successful use of the vaporizer for foil manufacture. Hence will be understood the importance of the present invention in making practical, for the first time, commercial foil manufacture by vapor depositing process.

Before describing embodiments of the invention it remains to be pointed out that the advantages of the present invention in respect of vaporizing rate, vapor confinement, vapor uniformity, and freedom from sputtering are obtained even though equipment in accordance with the invention is simpler, less costly and safer than conventional equipment. This is to say, equipment in accordance with the present invention has advantage even in those applications where vapor confinement, depositing uniformity and freedom from sputtering are of no significance—for example, in liquid purifying by distillation process or in vapor heating. Hence, a final main object of the invention will be understood which is to provide more economic vaporizing means for any process utilizing copious vapor including water purification by distillation, steam heating, and copper smelting by copper vapor.

(III) Preferred embodiments of the invention

Forming part of the description are FIGURES 1–4 of which:

FIGURE 1 diagrammatically illustrates a basic apparatus in accordance with the present invention;

FIGURE 2 is a cutaway perspective view of the apparatus of FIGURE 1 adapted to vaporize copper;

FIGURE 3 is an enlarged view of the orifice portion of FIGURE 2;

FIGURE 3(a) is a sectional view taken substantially upon the plane indicated by sectional line 3(a)—3(a) of FIGURE 3 and shows the detail structure of coil 22;

Figure 1:
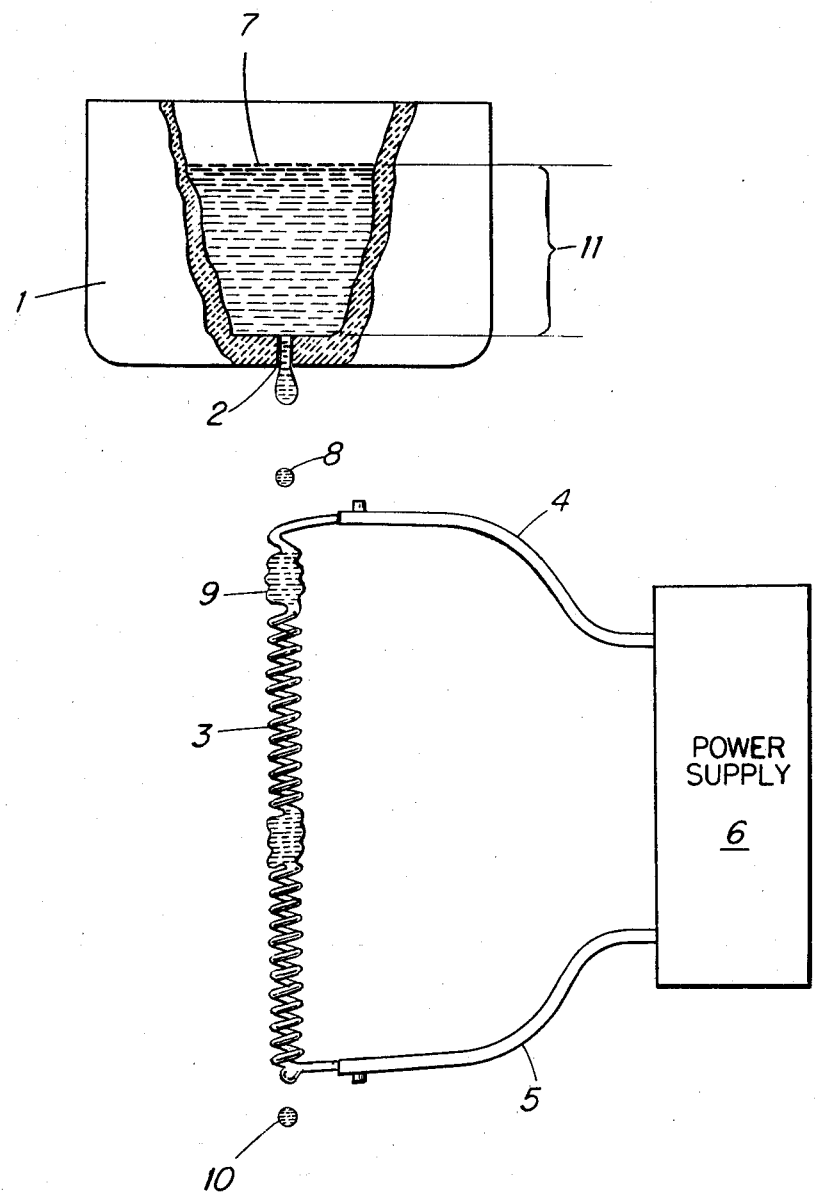

Referring first to FIGURE 1 which diagrammatically illustrates a basic vaporizer in accordance with the present invention, 1 is a container, 2 is an orifice in the bottom of the container, and 3 is an elongated coil. 4 and 5 are electrical leads connecting the coil to an electrical power supply 6. Liquid 7 flows out of the container through the orifice forming drips 8 on leaving the orifice. Drips 8 enter the coil one after the other at the top forming globules 9 which run down the coil forming drops 10 on leaving the coil at the bottom. A voltage maintained across the coil by power supply 6 heats the coil and the liquid flowing down the coil so as to vaporize at least part of the liquid.

It will be apparent that for the apparatus of FIGURE 1 to perform more or less consistently as described above a number of conditions need to be met. These conditions are that:

Container 1 (a) be of material not substantially reacted upon or dissolved by the liquid, and (b) be at a temperature appropriate to maintaining the material to be vaporized in a liquid state;

Orifice 2 (a) be of material not substantially reacted upon or dissolved by the liquid, and (b) be a "stable dripping orifice" as will be explained later;

Coil 3 (a) be of material not substantially reacted upon or dissolved by the liquid, (b) be an electrical conductor in at least the case the liquid is a non-conductor, and (c) be a "stable flow coil" as will be explained later.

If the above conditions are met in the apparatus of FIGURE 1, the liquid drips steadily from the orifice, runs steadily down the coil and is evaporated to an extent depending upon the amount of power supplied. If the rate of flow is appropriate, depending of course upon the heat of vaporization of the liquid, the electrical properties of the liquid and the coil, the dimensions of the coil, and the power supplied, substantially all the liquid entering the top of the coil will be evaporated before reaching the bottom of the coil.

The "stable dripping orifice" and "stable flow coil" referred to above will now be explained.

If the orifice is large enough in relation to the pressure of liquid (head 11 in FIGURE 1), liquid emerges from the orifice in a continuous stream which does not break up until considerably away from the orifice—this is termed "stream flow." On the other hand, if the orifice is small enough in relation to the pressure of liquid, liquid emerges from the orifice so as to break away from the orifice in discrete droplets—this is termed "drip flow." Drip flow is of course a much slower type of flow than stream flow and is, generally, the preferred type of flow for purposes of the present invention. However, drip flow is commonly an unstable type of flow. This is to say that a liquid will commonly drip from an orifice with a somewhat random variation in the size and rate of drips. An orifice which permits this unstable type of drip flow, as indeed do most common orifices, is termed an "unstable-dripping-orifice." It is however possible, for most liquids at least, to construct an orifice which drips with but little variation in drip size and rate—such an orifice is termed a "stable-dripping orifice." Of the various factors determining drip-flow, the wetting properties of the liquid with respect to the orifice material and the shape of the orifice, particularly in the exit region, are the most critical with respect to stabilizing the dripping. As a general rule, an orifice which is not wet by the liquid in the exit region and which also has its smallest cross-section in the exit region is a more or less stable-dripping-orifice for at least some range of liquid pressure.

Whether or not an unstable-dripping-orifice is useful in the apparatus of FIGURE 1 in a particular situation depends, of course, upon the situation and upon how unstable the orifice is. In most vaporizing situations, including foil manufacture, some variation in the size and rate of drips is tolerable so long as the net rate of flow is substantially constant—which is to say an increase in size of drip is compensated for by a lower rate of drip and vice versa. On the other hand in some situations, including steam generation, even some variation in net rate of flow can be accommodated without undue difficulty.

In completion of the broad description of the typical vaporizing apparatus of FIGURE 1, there remains the matter of the "stable-flow-coil." In determining how liquid runs down the coil a critical factor, of course, is whether or not the coil is of a material which is wet by the liquid. If the liquid does not wet the coil, the coil acts merely to partially obstruct the free fall of the liquid drips so as, generally, to break up the drips and scatter around the pieces. This is to say that a coil which is not wet by the liquid is generally not to be favored for the purposes of the invention. On the other hand, if the coil is wet by the liquid, there are three main ways in which drips entering the top of the coil can flow down the coil. In the first way, each drip entering the coil spreads down the coil more or less immediately without bridging turns of the coil. This type of flow is termed "non-bridging flow." In the second way, each drip entering the coil forms a hollow globule at the top of the coil bridging at least two turns of the coil which then proceeds to run down the coil. This type of flow is termed "hollow-bridging globular flow." In the third way, each drip entering the coil forms a solid globule at the top of the coil bridging at least two turns of the coil which then proceeds to run down the coil. This type of flow is termed solid-bridging globular flow. Each of the above three types of flow is a stable flow under certain conditions, depending upon the rate of flow, properties of the liquid, properties and dimensions of the coil, and power supplied to the coil. Of the three types of flow solid-bridging globular flow is preferred for the purposes of the present invention since it accommodates a wider range of flow rates than non-bridging flow and is much less prone to instability than hollow-bridging flow. Hence, it will be understood that coil 3 in the apparatus of FIGURE 1 is preferably of the type that stably sustains solid-bridging flow. What in detail comprises such a stable-solid-bridging-flow coil will be explained later in connection with FIGURE 3. For the moment, however, in further illustration of the complexity of the coil flow situation, it is worth noting two common coil flow instabilities. The first common instability is termed "throwing off" and can occur in any of the above three types of flow. "Throwing off" is the ejecting all around the coil of particles of liquid by the increasingly rapid rotation of the liquid as it flows from top to bottom of the coil. The second common instability is termed "bunching up" and can also occur in any of the above three types of flow but occurs most readily and with most serious consequences in hollow-bridging flow. "Bunching up" is the gathering together of a succession of small globules into one large globule, as, for example, if one globule on the coil stops moving and the following globules bunch up behind. In the case of hollow-bridging globular flow, the tendency to bunch up is especially pronounced and results usually in large parts of the coil being bridged by extensive hollow columns of liquid. With most liquids including molten copper, the formation and movement of the extensive liquid columns along the coil can be extremely erratic. This is to say, the bunching up of hollow-bridging globular flow results in most cases in extremely variable rates of flow and distribution of liquid along the coil.

As in the case of orifice flow-stability, the effects of coil flow-instability upon accomplishment of the purposes of the invention in a particular situation depend, of course, on the situation and the extent of the instability. For a situation such as foil manufacture "throwing-off" is obviously undesirable. On the other hand, for a situation such as steam generation "throwing-off" may be of little consequence.

It will by now be broadly understood, in connection with FIGURE 1, how a basic apparatus in accordance with the present invention is composed and how it functions. It will also by now be understood that the flow elements of the apparatus—namely, the orifice and the coil—are of somewhat critical design. To be described next is an adaption of the basic apparatus of FIGURE 1 to the vaporization of copper.

With reference now to FIGURE 2, the similarity of this copper vaporizing apparatus with the apparatus of FIGURE 1 will be obvious. 20 is the container, 21 is the orifice and 22 is the coil. In order to maintain the copper molten, container 20 is heated by heating elements 23 and insulated by reflectors 24. In order to apply power to coil 20 from power supply 25, the upper end of coil 20 is connected via orifice 21, container 20, container support 26 and lead 27 to power supply 25, while the lower end of coil 20 is connected via coil termination 29, coil termination wire 30 and lead 31 to power supply 25.

In further detail of the various main parts of the apparatus, container 20 is of graphite; orifice 21 which will be separately described later is partly of graphite, partly of boron nitride and partly of tungsten wire and coil 22 is of triple-stranded tungsten wire, each strand forty thousandths of an inch in diameter. Coil 22 is wound at nine turns to an inch and has an inside diameter of about one-eighth of an inch and a length of about seventeen iches. It may be noted that a closer turn spacing of coil 22 leads undesirably to a tendency toward hollow-bridging flow with the consequent tendency for extensive bunching up whereas a wider turn spacing leads undesirably to a tendency toward throwing off. Power supply 25 is a combination of fixed and variable transformers furnishing up to about one hundred and fifty amps at up to fifty volts.

Various subsidiary parts of the apparatus will now be described in further detail. Heating elements 23 are tungsten wire coils encased in boron nitride tubes Reflectors 24 are of molybdenum sheet. Container support 26 is of compacted carbon. Coil termination 29 is a hairpin of tungsten wire similar to coil 22 wire, inserted prongs uppermost into coil 22. Coil termination wire 30 is a doubled piece of tungsten wire similar to coil 22 wire passing through the hairpin loop of coil termination 29.

It will be noted that the choices of materials for container 20, orifice 21 and coil 22 comply with the conditions outlined in connection with FIGURE 1. This is to say graphite, boron nitride and tungsten are not substantially reacted upon nor dissolved by molten copper. Moreover boron nitride is not wet by molten copper, which is important in orifice 21 as will be explained later, and tungsten is wet by molten copper, which as explained earlier is important in coil 22. Multi-strand tungsten wire is used for coil 22 instead of single-strand, partly to facilitate stable flow and partly to facilitate coil fabrication. Alternative materials and forms of the materials will of course occur to those skilled in the art, but the above combination is a preferred one, well tried in practice, for copper. The choice of materials for subsidiary parts of the apparatus such as heating elements 23 is of course much less critical and will not be dwelt upon.

A typical copper vaporization procedure using the apparatus of FIGURE 2 will now be described: Preliminary to this it may be understood that the entire apparatus of FIGURE 2 with exception of power supply 25 is enclosed by a vacuum tank and that the copper vapor is deposited, for example, for investigation purposes, on pieces of stainless steel sheet placed around the apparatus.

First, about 3 pounds of copper pieces are placed in container 20, the tank is closed and a vacuum is pumped. After the vacuum has reached a few microns, about 3 kilowatts of power is supplied to heating elements 23 from an appropriate supply not shown in FIGURE 2. Immediately after the copper in container 20 has melted (as indicated, for example, by a thermocouple enclosed in a molybdenum sheath and immersed in the copper) about 40 volts is applied across coil 22 from power supply 25. As the temperature of orifice 21, heated by the upper part of coil 22, rises above the melting point of copper, copper starts to flow through orifice 21 and to drip into coil 22. The copper drips form solid globules which run down coil 22 forming and replenishing a helical sheath of copper substantially the whole length coil from whence the copper is evaporated. As the copper in container 20 is used up, the flow through orifice 21 and down coil 22 stops. Finally, the power supplies are turned off and the apparatus is allowed to cool.

In connection with the above vaporization procedure, the following details may be noted: Orifice 21, as will be described later in conjunction with FIGURE 3, furnishes a flow rate of about 6 pounds per hour with one and one-half inch head of copper in container 20 (a three pound load) reducing to about 4 pounds per hour as container 20 empties. Orifice 21 delivers this flow in drips about one-sixth of an inch in diameter which is to say the starting flow is about fifty drips per minute and the finishing flow is about thirty-five drips per minute. These drips form solid globules on entering coil 22, each globule bridging about three turns. These globules, which of course diminish in size as they run down the coil replenishing the copper sheath, travel the length of the coil in about three seconds, which is to say there are typically two or three globules on the coil at any one time. Depending upon minor vagaries of the coil there may be, as explained previously, minor "bunching-up" at the top of coil 22 to the extent that the single-drip-globules pair up into half as many double-drip-globules, each bridging about six turns initially. Thus, there may be typically only one globule on coil 22 at any one time and this globule travels the length of the coil in about two seconds. Further, depending also on minor vagaries of the coil, there may be minor "bunching-up" someway down the coil as globules, diminished in size as a consequence of replenishing the copper sheath, double or even triple up before continuing down the coil. The above types of "bunching-up" phenomena, and indeed any that have been observed on solid-bridging flow coils such as coil 22 fed by orifices such as orifice 21 at rates and with voltages as specified above, have negligible effect on the vaporization operation. The main reason for this, of course, is that at any one time only a small fraction of the coil, generally less than one-tenth, is occupied by globules. The vaporization is from the copper sheath which extends the whole length of the coil except for the small fraction occupied by the globules, and the globules serve merely to replenish the sheath. At the 6 pounds per hour starting rate of flow with 40 volts across coil 22, about 5 pounds per hour of copper is evaporated, which is to say 1 pound per hour of copper drips off coil termination 29. At the 4 pound per hour finishing rate of flow with 40 volts across coil 22 all but a few ounces is vaporized. This is to say the copper sheath is sustained the whole length of coil 22 throughout the vaporizing part of the operation. This is also to say that of the 3 pounds of copper loaded into container 20 only about 4 ounces is not vaporized and drips to waste off termination 29. The vaporization of this almost 3 pounds of copper takes about 35 minutes and consumes about 3 kilowatt hours of energy from power supply 25. Almost all of this 3 kilowatt hours goes into vaporization and very little into radiant heat loss despite a vaporization temperature of in excess of 1500 degrees centigrade because of the extremely low thermal emissivity of the copper sheathed coil 22. By way of comparison, the radiant heat loss of the bare coil 22 with 40 volts applied is over 2 kilowatts as compared to an estimated few hundred watts for the wet copper sheathed coil 22 even though the temperatures are comparable. The resistance of the dry coil 22 is about double that of wet coil 22 since the copper sheath offers about the same resistance as the tungsten wire. It follows that the current being drawn from power supply 25 approximately doubles to about 120 amps when the flow of copper starts down coil 22, the voltage remaining at 40 volts, and that the power consumed by coil 22 accordingly doubles to about 5 kilowatts.

To complete the description of the apparatus of FIGURE 2 attention is now directed to FIGURE 3 which is an enlarged cutaway view of part of container 20, orifice 21 and the top portion of coil 22. Copper is shown flowing through orifice 21 and down coil 22. With reference to FIGURE 3, 31 is the body of the orifice, about one-half inch in outside diameter, one and one-half inches long and made of graphite; 32 is the connecting piece, also of graphite; 33 is the flow-control-insert which is a tungsten wire coil of twenty-five-thousandths wire; 34 is the holding-chamber which is the interior of a tungsten wire coil of triple-stranded twenty-thousandths diameter wire; 35 is the drip-former which is of boron nitride; and 36 is the holding-collar for coil 22 and is of boron nitride. It will be noted that body 31 is threaded into container 20, connecting piece 32 is threaded onto body 31, drip-former 35 is threaded into connecting-piece 32, and collar 35 is threaded into connecting-piece 32. The design reasons for the various parts are as briefly follows: flow-control-insert 33 which has an inside diameter of about twenty-five-thousandths is used instead of an equivalent bore directly in body 31, because initiation and maintenance of stable flow through this size bore is obtained more reliably with tungsten than with graphite; holding-chamber 34 is required because the drips that would form directly from insert 33 are too small, and it is necessary therefore to feed first into a chamber whose surface is wet so as then to feed from this larger cross-section into larger drips; drip-former 35 is of boron nitride because boron nitride is not wet by molten copper and has a shaped bore so as to define a minimum cross-section at which the drips break away.

From the above it will have been understood at least that the design of orifice 21 so as to obtain stable flow of the right amount delivered in the right size drips is by no means a straightforward matter and requires considerable art. It will be appreciated also that there are other considerations in orifice design not mentioned herein but of considerable importance such as ability to withstand repeated heat cycles, which include solidification of the liquid, and ability to perform consistently over long periods.

With reference again to FIGURE 3, in order to clarify somewhat the way in which the molten copper flows out of orifice 21 and down coil 22, 37 is a drip already formed in drip-former 35 but not yet broken away; 38 is a drip just broken away; 39 is a globule having just been formed from a drip; 40 is a globule having been formed prior to globule 39. The enlarged sectional view FIGURE 3(a) shows the copper sheath 41 which extends the length of the coil. For illustration purposes the result of a somewhat faster drip-rate is shown in FIGURE 3 than was described in connection with FIGURE 2.

In conclusion of the description of the basic copper vaporizing apparatus of FIGURES 2 and 3, it may be stated that insofar as copper vaporizing efficiency is concerned the design and procedure given above are more or less optimum. This is to say, that rate of vaporization per unit area of coil surface is about as high as it can be without getting into difficulties, on one hand with excessive temperature ionization of the vapor due to higher power loading and on the other hand with coil flow instabilities such as "throwing-off" due to higher flow rates. In this connection, both the vaporization rate efficiency (60 pounds per hour per square foot of vaporizing surface) and the power use efficiency (1 kilowatt hour per pound) are considerably higher for the apparatus of FIGURES 2–3, operated as described above, than for any conventional vaporizers including electron beam and induction-heated. Hence, it will be understood that the basic apparatus of FIGURE 2, having the above high efficiencies, being free of sputtering tendency and being adaptable to furnishing a uniform deposit with minimum vapor escape, is an excellent basis for commercial apparatus for manufacturing foil and the like.

The main limitations of the basic apparatus of FIGURE 2 for commercial use such as foil manufacture are more or less obvious. Firstly, this basic apparatus does not vaporize continuously since there is no provision for feeding and melting continuously. Secondly, this basic apparatus vaporizes only about 5 pounds of copper per hour since there is only about 12 square inches of vaporizing surface. Thirdly, the vapor issues inconveniently from the point of view of depositing substantially entirely on a limited depositing surface since the vaporizing surface is completely unshielded. Fourthly, the basic apparatus vaporizes only liquids which do not react with or dissolve graphite, boron nitride and tungsten and which do not wet boron nitride and do wet tungsten.

Continuous vaporizing, meaning continuous feeding and melting, requires, for example, mechanical contrivances feeding solid copper piece by piece to a heated container which is large enough and supplied with power enough to hold its charge molten despite the continuous introduction and melting of solid. High vaporizing rates, meaning a large area of vaporizing surface, require, most simply for example, a multiplicity of orifices feeding a multiplicity of coils. Directed and confined vapor, meaning a shielded vaporizing surface, requires firstly, positioning the coils in appropriate relation to the depositing surface and secondly, enclosing the coils and the depositing surface with an appropriately heated enclosure. Vaporizing liquids not compatible with graphite, boron nitride and tungsten, meaning of course alternative materials, requires, for example, for aluminum, fibrous pyrolytic graphite to be used instead of tungsten.

Figure 4B:
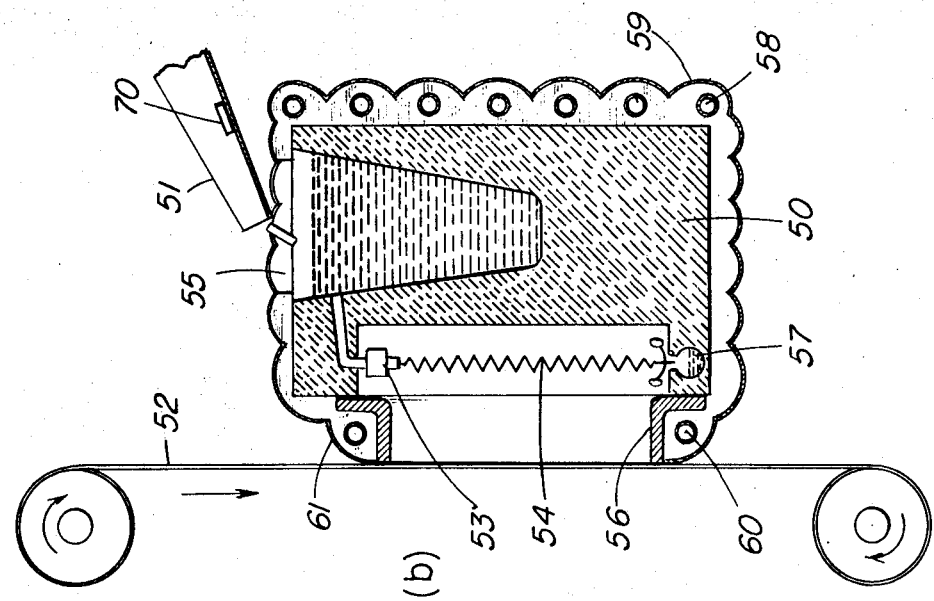
FIGURE 4(b) is a sectional view taken substantially upon the plane indicated by sectional line b—b of FIGURE 4(a) and shows the cross-sectional details of the vaporizer of FIGURE 4(a).
Figure 4A:
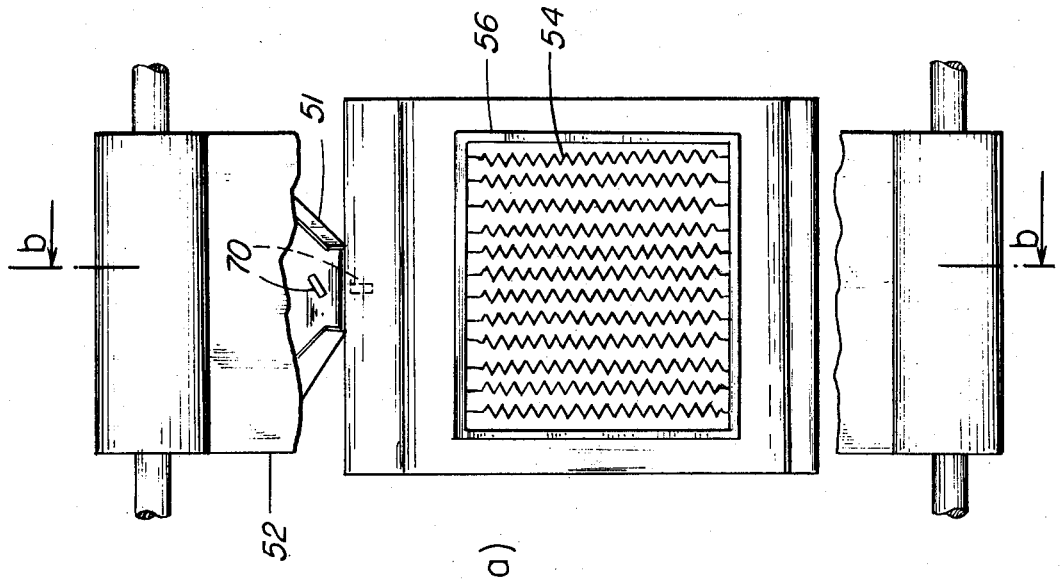
FIGURE 4(a) is a diagrammatic illustration of a typical commercial embodiment of a vaporizer in accordance with the present invention.

Attention is now directed to FIGURE 4(a) which is a diagrammatic front view and FIGURE 4(b) which is a diagrammatic side cross-sectional view of a copper vaporizer in accordance with the present invention. The vaporizer is shown, for example, being used to coat a steel strip.

With reference first to FIGURE 4(a), 50 is the vaporizer, 51 is the feed-chute, and 52 is the steel strip (broken away for clarity). With reference next to FIGURE (4b), 53 is one of twelve identical orifices, 54 is one of twelve identical coils, 55 is the feed-reservoir, 56 is the adapting-frame, 57 is the surplus flow gutter, 58 is one of a number of heating elements disposed around the back and sides of vaporizer 50, 59 is one of a number of heat reflectors disposed around vaporizer 50, 60 is one of a number of heating elements disposed around frame 56, and 61 is one of a number of heat reflectors disposed around frame 56.

With reference now to both FIGURES 4(a) and 4(b) the following features of the apparatus will be noted: The continuous feed is by conveying pieces of copper 70, for example, pieces of copper rod, down chute 51 into reservoir 55. For example, about sixty pounds per hour in the form of one piece every half-minute of six-inch long by half-inch diameter copper rod is fed into reservoir 55. Reservoir 55 holds about fifty pounds of molten copper and is maintained at about 1250 degrees centigrade. Orifices 53 are fed from the upper part of reservoir 55. For example, when the head of copper above each orifice is about an inch, assumming orifices 53 to be identical with orifice 21 of FIGURE 2, the rate of flow through each orifice is about five pounds per hour. Coils 54 are terminated directly above gutter 57 so that any copper flowing down coils 54 and not evaporated drips into gutter 57 so as then to run out of one end of vaporizer 50 into a suitable container (not shown) for periodic disposal. Heating elements 58 in conjunction with heat reflectors 59 are for supplying heat, firstly, for melting the sixty pounds per hour of copper and, secondly, for maintaining vaporizer 50 above the melting point of copper. Heating elements 60 in conjunction with heat reflectors 61 are for maintaining adapting frame 56 at a high enough temperature that there is substantially no condensation of copper on frame 56.

From the above and from earlier descriptions, the following typical attributes of the apparatus of FIGURES 4(a) and 4(b) will be more or less readily understood. The copper vapor issues from the front of vaporizer 50 through the opening bordered by frame 56. For coating a twelve-inch wide strip this opening is typically about eleven and one-half inches wide and about twelve inches high. With appropriate heat supplied by heating elements 58 and 60 and the radiant heat from coils 54 while evaporating, there is generally no appreciable accumulative condensation on the inner surfaces of vaporizer 50 behind, above, below and to both sides of coils 54; which is to say, these inner surfaces, being maintained at a high enough temperature, serve, in effect, as reflectors for vapor issuing from coils 54. The vapor issuance is substantially uniform across the width of frame 56 due to the similar behavior of orifices 53 and coils 54 but has been observed as varying somewhat slightly from top to bottom due to the somewhat lower rate of vaporization from the tops as compared to the bottoms of coils 54; this vertical variation in vapor issuances does not, of course, affect the uniformity of the strip coating, since the strip itself is moving in the vertical direction. The rate of vapor issuance is substantially uniform providing the copper pieces are fed to reservoir 55 at a steady rate and a steady voltage is maintained across coils 54. The intermittent variation in heat due to the piece by piece feeding is, in view of the capacity of reservoir 55, very small and has negligible effect on the vaporization rate. Hence, the coating of strip 52 is substantially uniform along the length so long as the speed of strip is constant. The vapor depositing on strip 52 is substantially free of liquid particles, mainly because there is no tendency for "sputter" from coils 54 (which are the same, for example, as coil 22 of FIGURE 2), but also because coils 54 operate without tendency to the "throwing-off" type instability. Finally, it will be understood that the vapor issuing from vaporizer 50 is deposited substantially entirely on strip 52—which is to say, with very little vapor escape for the reasons that; firstly, the shape of the periphery of frame 56 closely matches the shape of strip 52 which is flat in this instance; secondly, the periphery of frame 56 is close to strip 52; and thirdly, strip 52 overlaps the opening in frame 56, slightly at each side and extensively at top and bottom.

The commercial use of the present invention for copper coating steel strip will now be understood, at least in principle, and from this example it will be more or less obvious to those skilled in the art how the invention may be put to other commercial uses. Those skilled in the art will, for example, recognize that such design matters as number and disposition of orifices and coils, shielding means, framing means, heating means and feeding means, all of which vary of course from use to use, are more or less straight forward provided that the orifice-coil combination is itself properly designed and operated. The proper design and operation of an orifice-coil combination in accordance with the present invention have, or course, already been explained, particularly in the case of copper evaporation. For example, it has been explained that to get a liquid, especially a liquid like molten copper, to flow down a coil in stable reproducible fashion so as to be almost completely evaporated is by no means straightforward and depends upon recognizing and reconciling a number of factors. The most important recognitions are that liquid flow from orifice to coil be as discrete drips rather than as a stream and that vaporization from the coil be primarily from a helical sheath of liquid extending the length of the coil rather than from bodies of liquid traveling down the coil. Having explained the importance of drip flow and helical sheathing, it has then been explained that, towards attaining these, wetting properties of the liquid with respect to the materials used in the orifice and the coil are somewhat critical. It has then been further explained that, having recognized the importance of drip flow and helical sheathing and having furnished appropriate wetting properties towards attaining these, there remains the reconciliation of orifice design with coil design and with rate of flow and with power supply so as to attain stable efficient and reproducible vaporization. Although preference has been shown for vertical coils, it can easily be appreciated that such coils can be inclined from the vertical to an extent limited by the considerations of stable and efficient vaporization and replenishment. Accordingly, the claims are intended to encompass operative configurations, other than vertical, including coils with upwardly curved axes which may be replenished from either or both ends. Hence, altogether, novel means have been disclosed for vaporizing liquids, especially liquid metals such as molten copper, for many purposes, but especially for such purposes as foil manufacture and strip coating. I specifically claim as novel the following:

1. The method of vaporizing a liquid including maintaining a helical sheath of liquid over the surface of a helical coil which is wetted by the liquid by flowing liquid onto said coil at such a rate as to form discrete globules of liquid which descend the coil and heating said liquid sheath.

2. The method of claim 1 wherein the liquid is a metal.

3. The method of vaporizing a liquid comprising the steps of providing a supply of the liquid, deploying a film of the liquid in helical configuration over substantially the entire surface of a helical coil, heating the helical film to effect vaporization of the liquid, and maintaining the film by replenishment from periodic discharges of liquid issuing from the supply.

4. The method of vaporizing a material comprising the steps of:
  (a) maintaining a supply of the material to be vaporized in a liquid state,
  (b) providing a helical sheath of said liquid on the surface of a substantially verically disposed helix,
  (c) supplying heat to the helical liquid sheath to effect vaporization of the liquid, and
  (d) maintaining the helical liquid sheath replenished as liquid is vaporized by intermittently causing liquid from the supply to descend the helical surface as globules which temporarily bridge adjacent turns of the helix.

5. The method of claim 4 wherein the helix is wetted by the liquid.

6. The method of claim 5 wherein the liquid is an electrical conductor through which current is passed to heat the liquid sheath.

7. The method of claim 5 wherein the helix is an electrical resistor coil through which current is passed to heat the liquid sheath.

8. The method of claim 7 wherein the liquid is an electrical conductor.

9. The method of claim 8 wherein current is passed through the electrically conductive liquid to heat the sheath.

10. The method of claim 9 wherein the coil is tungsten and the liquid is molten copper.

11. The method of claim 9 wherein the coil is graphite and the liquid is molten aluminum.

12. The method of claim 9 wherein the coil is molybdenum and the liquid is molten copper.

13. The method of vaporizing a material comprising the steps of:
  (a) maintaining a supply of the material to be vaporized in a liquid state,
  (b) withdrawing material from the supply in the form of intermittent discharges,
  (c) conveying the intermittent discharges to an upper portion of a helical coil having spaced turns whose surface is readily wetted by the liquid to thereby form a relatively thin helical sheath of liquid about the turns of the coil,
  (d) supplying heat to the helical liquid sheath to effect vaporization of the liquid, and
  (e) regulating the discharges to cause the formation of globules of liquid on the coil which globules travel down the coil by gravity to thereby maintain the helical sheath replenished as liquid vaporizes.

14. The method of vaporizing a metal comprising the steps of:
  (a) maintaining a supply of metal in a motlen state,
  (b) causing drops of liquid metal to issue from drop forming means associated with the supply,
  (c) conveying the drops to an upper portion of a substantially vertically disposed helical coil having spaced turns whose surface is readily wetted by the liquid metal to form a helical sheath of liquid about the turns of the coil over substantially the entire surface of the coil,
(d) supplying heat to the helical liquid metal sheath to effect vaporization of the liquid,
(e) regulating the drops to cause the periodic formation of globules of liquid metal on the coil which globules bridge adjacent turns of the coil as they travel down the coil by gravity to thereby maintain the helical sheath replenished as the liquid vaporizes, and
(f) evacuating the environment of the coil.

15. The method of vaporizing copper comprising the steps of:
(a) maintaining a supply of molten copper,
(b) causing drops of copper to issue from drop forming means associated with the supply,
(c) impinging the drops on an upper portion of a substantially vertically disposed tungsten wire helical coil having spaced turns to form a helical sheath of molten copper about the turns over substantially the entire surface of the coil,
(d) supplying power to the coil and to the sheath to effect vaporization of the copper,
(e) regulating the drops to cause the periodic formation of globules of liquid metal which globules temporarily bridge adjacent turns of the coil as they travel down the coil by gravity to thereby maintain the helical sheath replenished as the liquid vaporizes, and
(f) evacuating the environment of the coil.

16. The method of vaporizing aluminum comprising the steps of:
(a) maintaining a supply of molten aluminum,
(b) causing drops of aluminum to issue from drop forming means associated with the supply,
(c) impinging the drops on an upper portion of a substantially vertically disposed graphite helical coil having spaced turns to form a helical sheath of molten aluminum about the turns over substantially the entire surface of the coil,
(d) supplying power to the coil and to the sheath to effect vaporization of the aluminum,
(e) regulating the drops to cause the periodic formation of globules of liquids metal which globules temporarily bridge adjacent turns of the coil as they travel down the coil by gravity to thereby maintain the helical sheath replenished as the liquid vaporizes, and
(f) evacuating the environment of the coil.

17. Apparatus for vaporizing liquids comprising a liquid supply, a drop forming orifice, a substantially vertically disposed helical coil, said coil being constructed of a material wetted by the liquid and wound with spaced turns of a diameter and spacing which will encourage the periodic formation of globules of liquid which bridge adjacent turns as they travel down the coil by gravity, the upper portion of said coil being located beneath said orifice, and heating means to effect vaporization of the liquid.

18. Apparatus for the vaporization of copper comprising a supply of molten copper, a drop forming orifice having an exit region formed from material not wetted by molten copper, a substantially vertically disposed helical heating coil having spaced turns of multiple strands of tungsten wire, said coil being positioned so as to intercept drops of copper issuing from the orifice, said coil being of a diameter appropriate to encourage the periodic formation of globules of molten copper from said drops, said globules bridging adjacent turns of the coil as they descend the coil by gravity to maintain a film of copper sheathing the turns of the coil replenished as the copper vaporizes, and means to supply electrical power to the coil and to the copper film to vaporize the copper.

19. Apparatus for depositing a film of metal by condensation of a metal vapor upon a carrier sheet comprising a supply of molten metal, a plurality of vertical helical coils disposed equidistant from the carrier sheet, a drop forming orifice for each coil, said coils being constructed of a material wetted by the molten metal and wound with spaced turns of a diameter and spacing which will encourage the periodic formation of globules of liquid which bridge adjacent turns as they travel down the coil by gravity, the upper portion of each coil being located beneath a drop forming orifice and heating means to effect vaporization of the molten metal from the wetted turns of the coil.

20. The apparatus of claim 19 further including a reflective surface disposed generally parallel to the carrier sheet and on the side of coils remote from the sheet to reflect heat and metal vapor toward the carrier sheet.

21. The apparatus of claim 19 wherein the carrier sheet is in the form of a strip which is arranged to be advanced in its plane to continuously expose uncoated carrier strip to the metal vapor and to continuously remove carrier strip having metal deposited thereon.

References Cited

UNITED STATES PATENTS

| 2,370,462 | 2/1945 | Hecker | 159—13.3 |
| 2,899,528 | 8/1959 | Reichelt | 118—49.5 |

FOREIGN PATENTS 11,351   5/1890   Great Britain.

OTHER REFERENCES

L. Holland, Vacuum Deposition of Thin Films, 1956, pages 108–118, 130–134, Wiley & Sons Inc., New York; Scientific Library.

JOSEPH V. TRUHE, Primary Examiner

PETER W. GOWDEY, Assistant Examiner

U.S. Cl. X.R.

219—271; 118—49; 202—236; 203—89